March 10, 1964 G. RAISBECK 3,124,654
VOCODER APPARATUS
Filed May 22, 1961
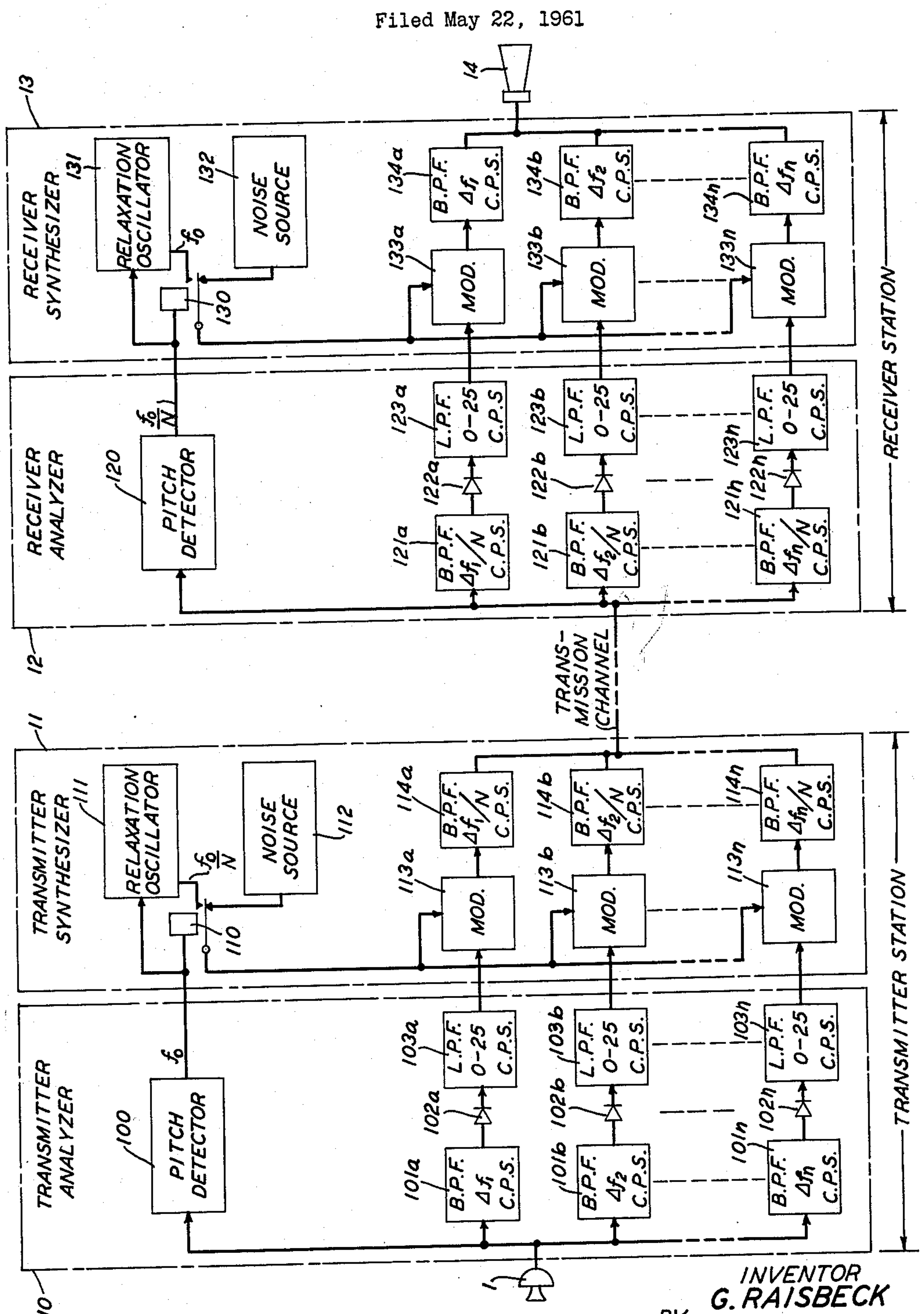
INVENTOR
G. RAISBECK
BY G. E. Hirsch, Jr.
ATTORNEY United States Patent Office 3,124,654

Patented Mar. 10, 1964

3,124,654
VOCODER APPARATUS

Gordon Raisbeck, Bernards Township, Somerset County, N.J., assignor to Bell Telephone Laboratories Incorporated, New York, N.Y., a corporation of New York Filed May 22, 1961, Ser. No. 111,704
5 Claims. (Cl. 179—15.55)

This invention relates to speech communications systems that transmit the information content of a wide band speech wave over a narrow band channel.

One of the best known systems for transmitting the information content of a wide band speech wave over a narrow band channel is the so-called channel vocoder of H. W. Dudley, described in Patent 2,151,091, issued March 21, 1939. The channel vocoder analyzes certain of the information-bearing characteristics of a speech wave to derive a group of slowly varying, unidirectional control signals that may be transmitted over a channel of substantially smaller bandwidth than that required for transmission of the speech wave. The characteristics analyzed by the channel vocoder at the transmitter station are the pitch of the speech wave and the amplitudes of the frequency components of the speech wave. Pitch information is typically conveyed by a single control signal that specifies whether the speech wave at a given instant represents a voiced or an unvoiced sound, and if the sound is voiced, the fundamental frequency component of the sound. The remaining control signals represent the amplitudes of the frequency components, the number of amplitude control signals depending upon the accuracy with which it is desired to specify the individual frequency components of the speech wave.

The pitch and amplitude control signals are transmitted over a narrow band channel to a receiver station, where artificial speech is synthesized from the transmitted control signals. Although the magnitudes of the control signals vary slowly, all of the control signals are essentially unidirectional, and therefore provision must be made to prevent interference between the control signals during transmission.

One method for preventing interference between the control signals is to provide a separate path for each signal. Where a number of separate paths is not feasible, the well-known carrier multiplex system described in the above-mentioned Dudley patent permits use of a single, narrow band transmission path by transposing the control signals to specific portions of the frequency scale of the transmission path.

The present invention completely avoids the problem of inteference between control signals and yet permits use of a single, narrow band transmission path by deriving from the plurality of control signals a single, narrow band signal which has the same information content as the control signals. In accordance with this invention, the control signals derived at the transmitter station are applied to a signal synthesizer of unique construction also located at the transmitter station. This transmitter sythesizer generates from the pitch control signal an excitation signal whose fundamental frequency is $1/N$ times the fundamental frequency of the original speech sound. From this reduced frequency excitation signal and from the amplitude control signals, the transmitter synthesizer reconstructs a group of frequency components in one-to-one correspondence with the frequency components of the original speech wave. The amplitude of each of the reconstructed components is proportional to the amplitude of the corresponding original component, but each reconstructed component has a frequency $1/N$ times that of the corresponding original component. The reconstructed components are combined to form a narrow band signal that may be transmitted directly to a receiver station over a signal transmission channel, the narrow band signal having a bandwidth $1/N$ times the bandwidth of the original speech wave. By thus converting the group of control signals into a single, narrow band signal, this invention simultaneously avoids the problem of interference between control signals during transmission and permits use of a single, narrow band transmission channel.

At the receiver station, there is provided, in accordance with this invention, an analyzer complementary to the transmitter synthesizer. The receiver analyzer derives from the transmitted narrow band signal a group of control signals. One of these control signals represents the pitch characteristic of the narrow band signal, and the remainder of the control signals represents the amplitudes of the frequency components of the narrow band signal. Since the fundamental frequency of the narrow band signal is $1/N$ times that of the original speech wave, the pitch control signal derived by the receiver analyzer represents the fundamental frequency of the original speech wave reduced by a factor of $1/N$. Further, since the amplitudes of the frequency components of the narrow band signal are proportional to the amplitudes of the frequency components of the original speech wave, the amplitude control signals derived by the receiver analyzer also represent the amplitudes of the speech frequency components.

The group of control signals derived by the receiver analyzer is applied to a channel vocoder synthesizer, which is adapted to generate from the pitch control signal an excitation signal whose fundamental frequency is N times the fundamental frequency of the narrow band signal, and is therefore equal to the fundamental frequency of the original speech wave. From the excitation signal and the amplitude control signals a replica of the original speech wave is reconstructed in typical vocoder fashion, the frequency components of the reconstructed speech wave being equal in frequency and proportional in amplitude to the corresponding frequency components of the original speech wave.

Both the transmitter station apparatus and the receiver station apparatus of this invention may be independently utilized to advantage in other speech transmission systems, that is, the transmitter and receiver station apparatus of this invention are compatible with other apparatus of the sort found at a receiver station or a transmitter station of other systems. The transmitter station apparatus of this invention, for example, may be advantageously used in conjunction with the receiver station apparatus described in the copending application of E. E. David, Jr., Serial No. 6,301, filed February 2, 1960, since the David apparatus, although designed on a different principle, synthesizes artificial speech from a narrow band signal having the characteristics of the narrow band signal generated by the transmitter station of the present invention.

Similarly, the receiver station apparatus of this invention is also suitable for reconstructing an artificial speech wave from a signal having the above-described characteristics of the narrow band signal generated by the transmitter station apparatus of this invention. Since there are vocoder systems other than that of the present invention whose transmitter stations generate signals with these characteristics, for example, the pitch synchronous vocoder described in E. E. David, Jr. et al. Patent 2,860,187, issued November 11, 1958, the receiver station apparatus of this invention may be used to reconstruct artificial speech waves from such signals, regardless of their source.

The invention will be fully understood from the following detailed description of an illustrative embodiment thereof taken in connection with the appended drawing, in which the single block diagram shows apparatus for transmitting a wide band speech wave over a single narrow band channel.

*Transmitter Station*

Referring now to the figure, there is shown a source 1 of a speech wave, for example, a telephone transmitter of conventional construction. The output terminal of source 1 is connected to the input terminal of transmitter analyzer 10, comprising the analyzer terminal of a channel vocoder. Within analyzer 10, the speech wave, which has a bandwidth of approximately 4,000 cycles per second, is applied in parallel to pitch detector 100 and bandpass filters 101*a* through 101*n*.

Pitch detector 100, wich may be of the type described in R. R. Riesz Patent 2,522,539, issued September 19, 1950, analyzes the speech wave to derive a unidirectional control signal indicative of the pitch characteristic of the speech wave. During unvoiced portions of the speech wave, the amplitude of the pitch control signal is zero, and during voiced portions of the speech wave, the amplitude of the pitch control signal is nonzero and is proportional to the fundamental frequency $f_0$, of the speech wave.

The pass bands of filters 101*a* through 101*n* are chosen to divide the frequency spectrum of the speech wave into *n* contiguous subbands, $\Delta f_1$ cycles per second through $\Delta f_n$ cycles per second, respectively, where the number and the widths of the individual subbands depend upon the degree of accuracy with which it is desired to represent the frequency components of the original speech wave. One suitable arrangement comprises $n=16$ filters whose pass bands are spaced across the frequency spectrum of the speech wave according to the Koenig Aural scale, that is, linear below 1,000 cycles per second and logarithmic above, with the lower subbands about 115 cycles per second in width, and the upper subbands about 450 cycles per second in width. To the output terminal of each filter 100*a* through 100*n* there is connected a rectifier, 102*a* through 102*n*, respectively, followed by a low-pass filter, 103*a* through 103*n*, where the cut-off frequency of each low-pass filter is about 25 cycles per second. The output signal of each low-pass filter is a unidirectional control signal whose instantaneous magnitude is representative of the instantaneous amplitude of the frequency components within the subband passed by the preceding bandpass filter. These amplitude control signals, together with the pitch control signal from pitch detector 100, constitute a group of signals that represent the information content of the original speech wave but which may be transmitted over a channel of substantially smaller bandwidth than that required for transmission of the original speech wave.

In order to transmit the control signals from analyzer 10 over a single transmission channel, however, they must be processed to prevent interference with one another during transmission, since the interference would distort the artificial speech reconstructed from the transmitted signals. In this invention, interference and distortion are prevented by applying the control signals to transmitter synthesizer 11 interposed between transmitter analyzer 10 and the single transmission channel. Transmitter synthesizer 11, which resembles a channel vocoder synthesizer, derives from the group of control signals a single, narrow band information-bearing signal whose bandwidth is $1/N$ times that of the original speech wave, where N may be any number greater than one.

To derive this narrow band signal, synthesizer 11 is provided with an excitation generator composed of switch 110, relaxation oscillator 111, and noise source 112. The pitch control signal is applied to the relay portion of switch 110 and to the control terminal of oscillator 111. During unvoiced sounds, when the amplitude of the pitch control signal is zero, the relay is not energized and switch 110 connects noise source 112 to the input terminals of modulators 113*a* through 113*n* to reconstruct a replica of the unvoiced portions of the speech wave.

During voiced sounds, when the amplitude of the pitch control is greater than zero, the relay is energized and relaxation oscillator 111 is connected to the input terminals of modulators 113*a* through 113*n*. Relaxation oscillator 111 may be of any well-known construction, and is designed to generate a signal whose fundamental frequency is $1/N$ times that represented by the pitch control signal; that is, if the instantaneous foundamental frequency represented by the ptch control signal if $f_0$ cycles per second, then oscillator 111 generates a signal whose fundamental frequency is $f_0/N$ cycles per second.

Each of the amplitude control signals from analyzer 10 is applied to the control terminal of one of the modulators 113*a* through 113*n* to adjust the amplitude of the excitation signal generated by oscillator 111 and noise source 112. The amplitude-adjusted output signals of the modulators are then passed to bandpass filters 114*a* through 114*n*, which have contiguous pass bands extending from $\Delta f_1/N$ cycles per second through $\Delta f_n/N$ cycles per second, respectively. Each filter 114*a* through 114*n* thus passes a frequency component whose amplitude is proportional to the amplitude of the frequency component of the original speech wave passed by the corresponding filter 101*a* through 101*n* of analyzer 10, but whose frequency is $1/N$ times that of the corresponding component of the orginal speech wave.

For example, if the frequency components passed by filters 101*a* through 101*n* are denoted $f_1, \ldots f_n$, then the frequency components passed by filters 114*a* through 114*n* are $f_1/N, \ldots f_n/N$, where $f_i$, $i=1, 2, \ldots n$, is in cycles per second. The output signals of filters 114*a* through 114*n* are combined, as by adding them together, to form a single narrow band signal having desirable transmission characteristics: its bandwidth is $1/N$ times that of the original speech wave and it may be transmitted directly to a receiver station over a single channel without the interference associated with direct transmission of the control signals from analyzer 10. Equally important, the characteristics of the narrow band signal are related in a specific manner to the information-bearing characteristics of the original speech wave, as described above, thereby facilitating reconstruction of replica of the original speech wave at the receiver station.

It is to be understood that the above-described transmitter station apparatus is not restricted to use with the receiver station apparatus of this invention, which is described below, but may be used with any other receiver station apparatus capable of reconstructing speech from the narrow band signal generated by the transmitter station. An example of other receiver station apparatus compatible with the transmitter station apparatus of this invention is disclosed in the aforementioned copending application of E. E. David, Jr., Serial No. 6,301.

*Receiver Station*

At the receiver station, the transmitted narrow band signal is passed to receiver analyzer 12, which resembles a channel vocoder analyzer and whose construction is complementary to that of synthesizer 11 located at the transmitter station. With analyzer 12, the narrow band signal is applied in parallel to pitch detector 120 and bandpass filters 121*a* through 121*n*. Pitch detector 120, which may be of the same design as pitch detector 100 at the transmitter station, derives a control signal whose amplitude is indicative of whether the narrow band signal represents a voiced or an unvoiced sound at a given instant, and if the sound is voiced, the fundamental frequency, $f_0/N$, of the narrow band signal.

Filters 121*a* through 121*n* have pass bands that are identical with the pass bands of filters 114*a* through 114*n*, and therefore divide the frequency spectrum of the narrow band signal into *n* contiguous subbands, $\Delta f_1/N$ cycles per second through $\Delta f_n/N$ cycles per second. Control signals representative of the amplitudes of the frequency components of the narrow band signals are derived by passing the frequency components within the contiguous subbands through rectifiers 122$a$ through 122$n$ followed by low-pass filters 123$a$ through 123$n$. The amplitude control signals, together with the pitch control signal, specify the information-bearing characteristics of the speech wave with the same accuracy as the control signals derived by analyzer 10 at the transmitter station, since the only distinction between the two sets of signals is the different fundamental frequency represented by each of the two pitch control signals. The factor $1/N$ by which the two fundamental frequencies differ is known; therefore, the fundamental frequency of the reconstructed speech wave may be made equal to that of the original speech wave by generating from the pitch control signal of detector 120 an excitation signal whose fundamental frequency is N times that represented by the pitch control signal.

As shown in the figure, the control signals from analyzer 12 are passed to receiver synthesizer 13, which is a channel vocoder synthesizer constructed to synthesize from the control signals of analyzer 12 a replica of the original speech wave. The excitation signal from which this replica is reconstructed is generated from the pitch control signal by switch 130, relaxation oscillator 131, and noise source 132. The pitch control signal is applied to the relay portion of switch 130 and to the control terminal of oscillator 131. During unvoiced sounds, when the amplitude of the pitch control signal is zero, the relay is not energized, and the switch connects noise source 132 to the input terminals of modulators 133$a$ through 133$n$ to reconstruct a replica of the unvoiced portions of the original speech wave. During voiced sounds, when the amplitude of the pitch control signal is greater than zero, the relay is energized and switch 130 connects the output terminal of relaxation oscillator 131 to the input terminals of modulators 133$a$ through 133$n$ to reconstruct a replica of the voiced portions of the original speech wave. Relaxation oscillator 131 is similar in construction to relaxation oscillator 111, but differs in that it is designed to generate an excitation signal whose fundamental frequency is N times that represented by the pitch control signal; that is, whereas the pitch control signal from receiver analyzer 12 represents a fundamental frequency of $f_0/N$ cycles per second, oscillator 131 generates a signal whose fundamental frequency is $f_0$ cycles per second.

The amplitude control signals from analyzer 12 are applied to the control terminals of modulators 133$a$ through 133$n$ to adjust the amplitude of the excitation signal to correspond to the amplitudes of the frequency components of the narrow band signal; since the amplitudes of the frequency components of the narrow band signal are proportional to the amplitudes of the corresponding frequency components of the original speech wave, the amplitude of the output signal of each modulator is proportional to the amplitude of a particular frequency component of the original speech wave. The output signal of each modulator is composed of harmonics of the fundamental frequency, $f_0$ cycles per second, and bandpass filters 134$a$ through 134$n$, which have contiguous pass bands that are identical with the pass bands, $\Delta f_1$ cycles per second through $\Delta f_n$ cycles per second, of filters 101$a$ through 101$n$ at the transmitter station, pass only the frequency component from each amplitude-adjusted excitation signal which corresponds in frequency to a particular frequency component of the original speech wave. The frequency components passed by filters 134$a$ through 134$n$ are combined to form an artificial speech wave that closely resembles the original speech wave, and audible speech may be reproduced by applying the artificial speech to the input terminal of reproducer 14, for example, a loudspeaker of any desired sort.

Although the operation of the receiver station apparatus of this invention has been described above in terms of reconstructing an artificial speech wave from the narrow band signal generated by the transmitter station apparatus of this invention, the receiver station apparatus of this invention is also suitable for reconstructing speech from narrow band signals generated by other types of vocoder transmitter station apparatus. As disclosed in the above-mentioned copending application of E. E. David, Jr., Serial No. 6,301, the transmitter station apparatus of a pitch synchronous vocoder of the sort shown in E. E. David, Jr. et al. Patent 2,860,187, November 11, 1958, derives from a speech wave a narrow band signal whose frequency components are in one-to-one correspondence with the frequency components of the speech wave, where the amplitudes of corresponding components are equal, and the frequencies of the components of the narrow band signal are $1/N$ times the frequencies of the corresponding components of the speech wave. Thus the narrow band signal derived from a speech wave by a pitch synchronous vocoder has the same frequency domain characteristics as the narrow band signal derived by the transmitter station apparatus of the present invention. It is therefore to be understood that the receiver station apparatus of this invention is not limited to use with the transmitter station apparatus of this invention, but may be utilized to reconstruct an artificial speech wave from any narrow band signal having the frequency domain characteristics described above.

It is to be understood that the above-described arrangements are merely illustrative of applications of the principles of the invention. Numerous other arrangements may be devised by those skilled in the art without departing from the spirit and scope of the invention.

What is claimed is:

1. In a system for transmitting the information content of a wide band speech wave over a narrow band channel, the combination that comprises a transmitter station including a source of a speech wave, a transmitter analyzer comprising means for deriving from said speech wave a first pitch control signal indicative of the fundamental frequency of said speech wave, and means for deriving from said speech wave a first group of control signals representative of the amplitudes of the frequency components of said speech wave, a transmitter synthesizer comprising means for generating from said first pitch control signal a first excitation signal whose fundamental frequency is $1/N$ times the fundamental frequency of said speech wave, and means for synthesizing from said first excitation signal and said first group of amplitude control signals a narrow band signal comprising frequency components which are in one-to-one correspondence with the frequency components of said speech wave so that corresponding components are proportional in amplitude and differ in frequency by a factor of $1/N$, means for transmitting said narrow band signal to a receiver station, and at said receiver station, a receiver analyzer comprising means for deriving from said narrow band signal a second pitch control signal indicative of the fundamental frequency of said narrow band signal, and means for deriving from said narrow band signal a second group of control signals representative of the amplitudes of the frequency components of said speech wave, a receiver synthesizer comprising means for generating from said second pitch control signal a second excitation signal having a fundamental frequency that is N times the fundamental frequency of said narrow band signal, and means for synthesizing from said second excitation signal and said second group of control signals an artificial speech wave closely resembling the original speech wave.

2. A system for transmitting the information content of a wide band speech wave over a narrow band channel which comprises a source of a first group of control signals representative of the information-bearing characteristics of a speech wave wherein one of said control signals is indicative of the fundamental frequency of said speech wave and the remainder of said control signals are indicative of the amplitudes of the frequency components of said speech wave, means for constructing from said first group of control signals a narrow band signal characterized by frequency components which occur at harmonics of a fundamental frequency that is $1/N$ times the fundamental frequency of said speech wave and which have amplitudes proportional to the amplitudes of corresponding frequency components of said speech wave, means for transmitting said narrow band signal to a receiver station, and at said receiver station, means for deriving from said narrow band signal a second group of control signals including a pitch control signal whose magnitude is proportional to the fundamental frequency of said narrow band signal and a subgroup of amplitude control signals whose magnitudes are proportional to the amplitudes of the frequency components of said speech wave, means for generating from said pitch control signal an excitation signal having a fundamental frequency that is N times the fundamental frequency of said narrow band signal, and means for synthesizing from said excitation signal and said subgroup of amplitude control signals a replica of said speech wave.

3. Apparatus for transmitting a plurality of channel vocoder control signals over a single transmission channel which comprises a source of chanel vocoder control signals representative of the information-bearing characteristics of a speech wave, means for synthesizing from said control signals a plurality of frequency components occurring at frequencies $f_1/N, f_2/N, \ldots f_n/N$ cycles per second and having amplitudes that are proportional to the amplitudes of the corresponding frequency components, $f_1, f_2, \ldots f_n$ cycles per second, of said speech wave, means for combining said synthesized frequency components to form a narrow band signal, and a single transmission channel for transmitting said narrow band signal to a receiver station.

4. Apparatus for reconstructing an artificial speech wave from a narrow band signal whose fundamental frequency is $1/N$ times the fundamental frequency of the original speech wave and whose frequency components, $f_1/N, f_2/N, \ldots f_n/N$ cycles per second, have amplitudes proportional to the amplitudes of the corresponding frequency components, $f_1, f_2, \ldots f_n$ cycles per second, of the original speech wave which comprises a first analyzing means for deriving from said narrow band signal a pitch control signal indicative of the fundamental frequency of said narrow band signal, a second analyzing means for deriving from said narrow band signal a group of amplitude control signals representative of the amplitudes of the frequency components of said original speech wave, means for generating from said pitch control signal an excitation signal having a fundamental frequency that is N times the fundamental frequency of said narrow band signal, and means for reconstructing an artificial speech wave from said excitation signal and said amplitude control signals.

5. A system for transmitting the information content of a wide band speech wave over a narrow band channel which comprises a transmitter station including a source of channel vocoder control signals representative of the information-bearing characteristics of a speech wave, means for synthesizing from said control signals a narrow band signal characterized by frequency components which are in one-to-one correspondence with the frequency components of said speech wave so that corresponding components of said narrow band signal and said speech wave are proportional in amplitude and differ in frequency by a factor of $1/N$, means for transmitting said narrow band signal to a receiver station, and at said receiver station, means for reconstructing an artificial speech wave from said narrow band signal.

References Cited in the file of this patent

UNITED STATES PATENTS

| | | |
|---|---|---|
| 2,151,091 | Dudley | Mar. 21, 1939 |
| 2,817,711 | Feldman | Dec. 24, 1957 |
| 2,911,476 | Kramer et al. | Nov. 3, 1959 |
| 2,996,579 | Slaymaker | Aug. 15, 1961 |